(12) United States Patent
Zhang

(10) Patent No.: US 11,418,979 B2
(45) Date of Patent: Aug. 16, 2022

(54) DYNAMIC BACKUP AMF DETERMINATION AND PUBLICATION

(71) Applicant: Telefonaktiebolaget LM Ericsson (publ), Stockholm (SE)

(72) Inventor: Hanbing Zhang, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 32 days.

(21) Appl. No.: 17/058,006

(22) PCT Filed: May 25, 2018

(86) PCT No.: PCT/CN2018/088417
§ 371 (c)(1),
(2) Date: Nov. 23, 2020

(87) PCT Pub. No.: WO2019/222995
PCT Pub. Date: Nov. 28, 2019

(65) Prior Publication Data
US 2021/0306875 A1    Sep. 30, 2021

(51) Int. Cl.
*H04W 24/04* (2009.01)
(52) U.S. Cl.
CPC .................. *H04W 24/04* (2013.01)
(58) Field of Classification Search
CPC .. H04W 24/04; G06F 9/5077; G06F 11/1482; G06F 11/2023; H04L 67/12; H04L 69/329
See application file for complete search history.

(56) References Cited

U.S. PATENT DOCUMENTS

| | | | |
|---|---|---|---|
| 10,986,516 B2* | 4/2021 | Dao | H04W 24/02 |
| 11,044,773 B2* | 6/2021 | Shaw | H04W 76/16 |

(Continued)

FOREIGN PATENT DOCUMENTS

| | | |
|---|---|---|
| CN | 104811324 A | 7/2015 |
| CN | 105357057 A | 2/2016 |

(Continued)

OTHER PUBLICATIONS

3GPP TS 23.501 v15.0.0; Technical Specification; 3rd Generation Partnership Project; Technical Specification Group Services and System Aspects; System Architecture for the 5G System; Stage 2 (Release 15)—Dec. 2017.

(Continued)

*Primary Examiner* — Chandrahas B Patel
(74) *Attorney, Agent, or Firm* — Baker Botts, LLP

(57) ABSTRACT

The embodiments herein relate to dynamic backup AMF determination and publication. In one embodiment, there proposes a method (900) in a Access and (Start Mobility Management Function (AMF) node (201, 202, 203, 204, 1100), comprising: obtaining (S901) first information of the AMF node (201, 202, 203, 204, 1100), the first information at least includes one or more identifier; obtaining (S902) second information of each of all other nodes (201, 203, 204, 1200) within the same AMF set as the AMF node (201, 202, 203, 204, 1100), the second information includes Relative Capacity (RC) and one or more identifier; and determining (S903) backup AMF for at least one identifier of the AMF (201, 202, 203, 204, 1100) based on the first information and the second information in an autonomous way, without the participation of the Operation Administration and Maintenance (OAM) (206). With embodiments herein, the backup AMF information is determined per GUAMI granularity and (Continued)

published automatically among all AMFs within the AMF set in an autonomous way.

20 Claims, 11 Drawing Sheets

(56) References Cited

U.S. PATENT DOCUMENTS

| | | | |
|---|---|---|---|
| 2006/0193247 | A1 | 8/2006 | Naseh et al. |
| 2021/0176650 | A1* | 6/2021 | Wang ................ H04W 8/14 |
| 2021/0219197 | A1* | 7/2021 | Prasad ............ H04W 36/245 |

FOREIGN PATENT DOCUMENTS

| | | |
|---|---|---|
| CN | 107453929 A | 12/2017 |
| JP | 4198920 B2 | 12/2008 |
| WO | 2004 032424 A1 | 4/2004 |
| WO | 2018 041247 A1 | 3/2018 |

OTHER PUBLICATIONS

3GPP TS 23.502 v15.0.0; Technical Specification; 3rd Generation Partnership Project; Technical Specification group Services and System Aspects; Procedures for the 5G System; Stage 2 (Release 15)—Dec. 2017.

SA WG2 Meeting #123; Ljubljana, Slovania; Source: ZTE; Title: TS 23.501 Clarification on backup AMF (S2-177792 (was S2-177093))—Oct. 23-27, 2017.

PCT Notification of Transmittal of the International Search Report and the Written Opinion of the International Searching Authority, or the Declaration issued for International application No. PCT/CN2018/088417—dated Feb. 13, 2019.

3GPP TS 23.501 v2.0.0; Technical Specification; 3rd Generation Partnership Project; Technical Specification Group Services and System Aspects; System Architecture for the 5G System; Stage 2 (Release 15)—Dec. 2017.

3GPP TS 23.501 v1.5.0; Technical Specification; 3rd Generation Partnership Project; Technical Specification Group Services and System Aspects; System Architecture for the 5G System; Stage 2 (Release 15)—Nov. 2017.

3GPP TSG CT WG4 Meeting #85; Osaka, Japan; Source: Nokia, Nokia Shanghai-Bell; Title: Supporting AMF Changes (C4-184301)—May 21-25, 2018.

3GPP TSG-RAN WG3 Meeting #99; Athens, Greece; Source: Nokia, Nokia Shanghai Bell; Title: Discussion on AMF management (R3-180989—Feb. 26-Mar. 2, 2018.

3GPP TSG-RAN3 Meeting #100; Busan, Korea; Change Request; Title: Remaining TNL aspects NG; Source to WG: Huawei; Source to TSG: RAN3 (R3-183262)—May 21-25, 2018.

European Search Report issued for Application No./Patent No. 18920171.8-1215 / 3804389 PCT/CN2018088417—dated May 27, 2021.

* cited by examiner

DYNAMIC BACKUP AMF DETERMINATION AND PUBLICATION

PRIORITY

This nonprovisional application is a U.S. National Stage Filing under 35 U.S.C. § 371 of International Patent Application Serial No. PCT/CN2018/088417 filed May 25, 2018 and entitled "DYNAMIC BACKUP AMF DETERMINATION AND PUBLICATION" which is hereby incorporated by reference in its entirety.

TECHNICAL FIELD

The embodiments herein relate generally to the field of communication, and more particularly, the embodiments herein relate to dynamic backup Access and Mobility Management Function (AMF) determination and publication.

BACKGROUND

<3GPP 5G System Architecture>
Architecture Reference Model

Third Generation Partnership Project (3GPP) release 15, Technical Specification (TS) 23.501-V15.0.0, chapter 4 describes the architecture for the fifth generation (5G) system. The 5G architecture is defined as service-based and the interaction between network functions is represented in two ways:

A service-based representation, where network functions (e.g. AMF) within the Control Plane enables other authorized network functions to access their services. This representation also includes point-to-point reference points where necessary.
  A reference point representation, shows the interaction exist between the NF services in the network functions described by point-to-point reference point (e.g. N11) between any two network functions (e.g. AMF and SMF). The 5G System architecture consists of the following network functions (NF).
  Authentication Server Function (AUSF)
  Access and Mobility Management Function (AMF)
  Data Network (DN), e.g. operator services, Internet access or 3rd party services
  Unstructured Data Storage Function (UDSF)
  Network Exposure Function (NEF)
  NF Repository Function (NRF)
  Network Slice Selection Function (NSSF)
  Policy Control Function (PCF)
  Session Management Function (SMF)
  Unified Data Management (UDM)
  Unified Data Repository (UDR)
  User Plane Function (UPF)
  Application Function (AF)
  User Equipment (UE)
  (Radio) Access Network ((R)AN)
  5G-Equipment Identity Register (5G-EIR)
  Security Edge Protection Proxy (SEPP).

FIG. 1 is a schematic block diagram showing non-roaming reference architecture of 5G. Service-based interfaces are used within the Control Plane (CP).

Network Function Functional Description

This clause specifies the 5G network function functional descriptions. Not all 5G network functions are described here. For a complete functional description of all 5G network functions, refer to 3GPP TS 23.501-V15.0.0, clause 6.

The AMF supports the following functionalities. Some or all of the AMF functionalities may be supported in a single instance of an AMF:
  Termination of RAN CP interface (N2).
  Termination of NAS (N1), NAS ciphering and integrity protection.
  Registration management.
  Connection management.
  Reachability management.
  Mobility Management.
The NRF supports the following functionality:
  Supports service discovery function. Receive NF Discovery Request from NF instance, and provides the information of the discovered NF instances (be discovered) to the NF instance.
  Maintains the NF profile of available NF instances and their supported services.
The UDSF is an optional function that supports the following functionality:
  Storage and retrieval of information as unstructured data by any NF.
<5G Globally Unique Temporary UE Identity (5G-GUTI)>
  According to 3GPP TS 23.003-V15.2.0, the 5G-GUTI has two main components:
  one that uniquely identifies the AMF which allocated the 5G-GUTI; and
  one that uniquely identifies the UE within the AMF that allocated the 5G-GUTI.
  Within the AMF, the mobile shall be identified by the 5G-TMSI.
  The Globally Unique AMF Identifier (GUAMI) shall be constructed from the MCC, MNC and AMF Identifier (AMFI).
  The AMFI is constructed from an AMF Region ID, an AMF Set ID and an AMF Pointer. The AMF Region ID identifies the region, the AMF Set ID uniquely identifies the AMF Set within the AMF Region, and the AMF Pointer uniquely identifies the AMF within the AMF Set.
  The 5G-GUTI is constructed from the GUAMI and the 5G-TMSI.
  The 5G-S-TMSI shall be constructed from the AMF Set ID, the AMF Pointer and the 5G-TMSI.
  The format and size of the 5G-GUTI is therefore the following:
  <5G-GUTI>=<GUAMI><5G-TMSI>,
    where <GUAMI>=<MCC><MNC><AMF Identifier>
    and <AMF Identifier>=<AMF Region ID><AMF Set ID><AMF Pointer>
      MCC and MNC shall have the same field size as in earlier 3GPP systems.
      5G-TMSI shall be of 32 bits length.
      AMF Region ID shall be of 16 bits length.
      AMF Set ID shall be of 4 bits length.
      AMF Pointer shall be of 4 bits length.
<3GPP AMF Load Balancing>
  The following texts are from TS-23.501-V15.0.0, clause 5.19.3.
  The AMF Load Balancing functionality permits UEs that are entering into an AMF Region/AMF Set to be directed to an appropriate AMF in a manner that achieves load balancing between AMFs. This is achieved by setting a Weight Factor for each AMF, such that the probability of the AN selecting an AMF is proportional to Weight Factor of the AMF. The Weight Factor is typically set according to the capacity of an AMF node relative to other AMF nodes. The Weight Factor is sent from the AMF to the NG-AN via NGAP messages.

NOTE 1: An operator may decide to change the Weight Factor after the establishment of NGAP connectivity as a result of changes in the AMF capacities. E.g., a newly installed AMF may be given a very much higher Weight Factor for an initial period of time making it faster to increase its load.

NOTE 2: It is intended that the Weight Factor is NOT changed frequently. e.g. in a mature network, changes on a monthly basis could be anticipated, e.g. due to the addition of RAN or CN nodes.

When Network slicing is deployed, load balancing by NG-AN node is only performed between AMFs that belong to the same AMF set, i.e. AMFs with the same PLMN and AMF Set ID value.

The NG AN node may have their Load Balancing parameters adjusted (e.g. the Weight Factor is set to zero if all subscribers are to be removed from the AMF, which will route new entrants to other AMFs within an AMF Set).

<3GPP AMF Load Re-Balancing>

The following texts are from TS-23.501-V15.0.0, clause 5.19.4. The AMF load re-balancing functionality permits cross-section of its subscribers that are registered on an AMF (within an AMF Set) to be moved to another AMF within the same AMF set with minimal impacts on the network and end users. AMF may request some or all of the AN node(s) to redirect a cross-section of UE(s) returning from IDLE mode to be redirected to another AMF within the same AMF set, if the AN is configured to support this. If AMF is configured with more than one GUAMI, the AMF may request some or all of the AN node(s) to redirect UE(s) served by one of its GUAMI(s) to a specific target AMF or to a different AMF within the same AMF set.

For UE(s) in IDLE mode, when UE subsequently returns from IDLE mode and the 5G-AN receives an initial NAS message with a 5G S-TMSI or GUAMI pointing to an AMF that requested for redirection, the 5G-AN should select the specific target AMF (provided by the original AMF) or a different AMF from the same AMF set and forward the initial NAS message. The newly selected/target AMF (which is now the serving AMF) will re-assign the GUTI (using its own GUAMI(s)) to the UE(s). It is not expected that the 5G-AN node rejects any request or enables access control restriction when it receives a request for redirection for load control from the connected AMF(s).

When the AMF wants to stop redirection, the AMF can indicate that it can serve all UE(s) in IDLE mode to stop the redirection.

NOTE 1: An example use for the AMF load re-balancing functionality is for the AMF to pro-actively re-balance its load prior to reaching overload i.e. to prevent overload situation.

NOTE 2: Typically, AMF Load Re-Balancing is not needed when the AMF becomes overloaded because the Load Balancing function should have ensured that the other AMFs within the AMF Set are similarly overloaded.

<3GPP AMF Management>

AMF Addition/Update

The following texts are from 3GPP TS 23.501-V15.0.0, clause 5.21.2.1.

The 5G System should support establishment of association between AMF and 5G-AN node.

A new AMF can be added to an AMF set and association between AMF and GUAMI can be created and/or updated as follows:

AMF shall be able to dynamically update the NRF with the new or updated GUAMI(s) to provide mapping between GUAMI(s) and AMF information. Association between GUAMI(s) and AMF is published to NRF. In addition, to deal with planned maintenance and failure, an AMF may optionally provide backup AMF information, i.e. it act as a backup AMF if the indicated GUAMI associated AMF is unavailable. Based on that information one GUAMI is associated with an AMF, optionally with a backup AMF used for planned removal and/or another (same or different) backup AMF used for failure.

Upon successful update, the NRF considers the new and/or updated GUAMI(s) for providing AMF discovery results to the requester. Requester can be other CP network functions.

Information about new AMF should be published and available in the DNS system. It should allow 5G-AN to discover AMF and setup associations with the AMF required.

To support the legacy EPC core network entity to discover and communicate with the AMF, the information about the AMF should be published and available in the DNS system.

AMF Auto-Recovery

The following texts are from 3GPP TS 23.501-V15.0.0, clause 5.21.2.3.

In order to try and handle AMF failure in a graceful manner (i.e. without impacting the UE), AMF can either back up the UE contexts in UDSF, or per GUAMI granularity in other AMFs (serving as backup AMF for the indicated GUAMI).

For deployments without UDSF, for each GUAMI the backup AMF information (in association to the GUAMI) is configured in the AMF. The AMF sends this information to 5G-AN and other CP NFs during the N2 setup procedure or the first (per NF) interaction with other CP NFs.

In case an AMF fails and the 5G-AN/peer CP NFs detect that the AMF has failed, or the 5G-AN/peer CP NFs receives notification from another AMF in the same AMF set that this AMF has failed, following actions are taken:

The OAM (Operation Administration and Maintenance) deregister the AMF from NRF indicating due to AMF failure.

5G-AN marks this AMF as failed and not consider the AMF for selection until explicitly notified.

For UE(s) in CONNECTED mode, 5G-AN considers failure detection or failure notification as a trigger to release the NGAP UE TNLA binding(s) with the corresponding AMF for the respective UE(s) while maintaining N3 (user plane connectivity) and other UE context information. For subsequent N2 message, if the backup AMF information of the corresponding failed AMF is not available the 5G-AN should select a different AMF (as in TS 23.501-V15.0.0 clause 6.3.5) from the same AMF set when the subsequent N2 message needs to be sent for the UE(s). If no other AMF from the AMF set is available, then it can select an AMF from the same AMF Region as in TS 23.501-V15.0.0, clause 6.3.5. If backup AMF information of the corresponding failed AMF is available, the 5G-AN forwards the N2 message to the backup AMF.

For UE(s) in IDLE mode, when it subsequently returns from IDLE mode and the 5G-AN receives an initial NAS message with a S-TMSI or GUAMI pointing to an AMF that is marked failed, if the backup AMF information of the corresponding failed AMF is not available the 5G-AN should select a different AMF from the same AMF set and forward the initial NAS message. If no other AMF from the AMF set is available, then it can select an AMF from the same AMF Region as in TS 23.501-V15.0.0, clause 6.3.5. If backup AMF information of the corresponding failed AMF is available, the 5G-AN forwards the N2 message to the backup AMF. Peer CP NFs consider this AMF as unavailable while retaining the UE context.

For the UE(s) that were associated to the corresponding AMF, when the peer CP NF needs to initiate a transaction towards the AMF, if backup AMF information of the corresponding failed AMF is not available, CP NF should select another AMF from the same AMF set and forward the transaction together with the old GUAMI. If backup AMF information of the corresponding failed AMF is available, the CP NF forwards transaction to the backup AMF.

When the 5G-AN or CP NFs need to select a different AMF from the same AMF set,

For deployments with UDSF, any AMF from the same AMF set can be selected.

For deployments without UDSF, the backup AMF is determined based on the GUAMI of the failed AMF.

Following actions should be taken by the newly selected AMF:

For deployments with UDSF, when there is a transaction with the UE the newly selected AMF retrieves the UE context from the UDSF and it processes the UE message accordingly and updates the 5G-GUTI towards the UE, if necessary.

For deployments without UDSF, backup AMF (the newly selected AMF), based on the failure detection of the old AMF, instructs peer CP NFs and 5G-AN that the UE contexts corresponding to the GUAMI of the failed AMF is now served by this newly selected AMF. The backup AMF shall not use old GUAMI to allocate 5G-GUTI for UE(s) that are being served by Target AMF. The backup AMF uses the GUAMI to locate the respective UE Context(s).

The new AMF updates the peer NFs (that subscribed to receive AMF unavailability notification from old AMF) with the new AMF information.

If the new AMF is aware of a different AMF serving the UE (by implementation specific means) it redirects the uplink N2 signalling to that AMF, or reject the transaction from the peer CP NFs with a cause to indicate that new AMF has been selected. The peer CP NFs may wait for the update from the new AMF and resend the transaction to the new AMF.

NOTE 3: This bullet above addresses situations where 5G-AN node selects an AMF and other CP NFs select an AMF for the UE concurrently. It also addresses the situation where CP NFs select an AMF for the UE concurrently.

NOTE 4: It is assumed that the UE contexts from the old AMF include all event subscriptions with peer CP NFs.

If the UE is in CM-IDLE state and the new AMF does not have access to the UE context, the new AMF selects one available AMF from the old AMF set as described in clause 6.3.5. The selected AMF retrieves the UE context from the UDSF and provides the UE context to the new AMF. If the new AMF doesn't receive the UE context then the AMF may force the UE to perform initial registration.

NOTE 5: The above N2 TNL association selection and AMF management is applied to the selected PLMN.

REFERENCES 1. 3GPP TS 23.501-V15.0.0
2. 3GPP TS 23.502-V15.0.0.

SUMMARY

In 3GPP existing solution, for each GUAMI, the backup AMF information (in association to the GUAMI) is statically configured in each AMF. The AMF sends this information to 5G-AN and other CP NFs during the N2 setup procedure or the first (per NF) interaction with other CP NFs.

It is obvious that the backup AMF information within an AMF set shall be updated or refreshed in the network for the following cases:
  AMF addition
  AMF planned removal
  AMF failure
  AMF recovery.

However, using OAM configuration to update the backup AMF information in the network can be cumbersome due to the operation inefficiency and operation delay. It does not fit well in 5G system that demands a highly automated network.

One example is that in case of AMF failure, the backup contexts on the failed AMF are lost so a new backup AMF needs to be determined timely.

Another example is that after an AMF has automatically restarted and recovered from a previous failure, this recovered AMF is ready to take normal traffic and ready to serve as backup AMF for other AMFs within the AMF set.

In both above examples, it is not realistic to rely on OAM operation to timely update the backup AMF information in the network.

In view of above typical case/problem in the prior art, the embodiments herein provides a dynamic and automatic solution to update the backup AMF information in the network in the following cases:
  AMF addition
  AMF update
  AMF planned removal
  AMF failure
  AMF recovery.

The GUAMI(s) and the relative capacity of an AMF are assigned through OAM operation during initial deployment.

After initial deployment, each AMF determines the backup AMF per GUAMI based on AMF relative capacity exchanged within an AMF set.

5G-AN and other CP NFs are updated with the new backup AMF information on GUAMI granularity.

The principle described in 3GPP TS 23.501-V15.0.0 that the backup AMF selection or determination is per GUAMI granularity, not per UE basis is kept in this disclosure. To select backup AMF per UE basis can cause lots of UE level signaling in the network if the backup AMF is changed and if the 5G-AN and other CP NFs need to be updated with the new backup AMF information.

In one embodiment, there proposes a method in a first AMF node, comprising: obtaining first information of the first AMF node, the first information at least includes one or more identifier; obtaining second information of each of all other nodes within the same AMF set as the first AMF node, the second information includes RC and one or more identifier; and determining backup AMF for at least one identifier of the first AMF based on the first information and the second information in an autonomous way, without the participation of the OAM.

In another embodiment, there proposes a method in a second AMF node, wherein the second AMF node is assigned one or more identifier, and wherein backup AMF has been determined for each of the one or more identifier, the method comprising: receiving a notification indicating a variation of a first AMF node from the NRF, the notification includes first information of the first AMF node, the first information at least includes one or more identifier; retrieving second information of each of all other nodes within the same AMF set, the second information includes RC and one or more identifier, and the second information is pre-stored on the second AMF node; and selectively changing backup AMF for at least one identifier of the second AMF based on the first information and the second information in an autonomous way, without the participation of the OAM.

In yet another embodiment, there proposes a first AMF node, comprising: at least one processor; and a non-transitory computer readable medium coupled to the at least one processor, the non-transitory computer readable medium contains instructions executable by the at least one processor, whereby the at least one processor is configured to: obtain first information of the first AMF node, the first information at least includes one or more identifier; obtain second information of each of all other nodes within the same AMF set as the first AMF node, the second information includes RC and one or more identifier; and determine backup AMF for at least one identifier of the first AMF based on the first information and the second information in an autonomous way, without the participation of the OAM.

In yet another embodiment, there proposes a second AMF node, wherein the second AMF node is assigned one or more identifier, and wherein backup AMF has been determined for each of the one or more identifier, the second AMF node comprising: at least one processor; and a non-transitory computer readable medium coupled to the at least one processor, the non-transitory computer readable medium contains instructions executable by the at least one processor, whereby the at least one processor is configured to: receive a notification indicating a variation of a first AMF node from the NRF, the notification includes first information of the first AMF node, the first information at least includes one or more identifier; retrieve second information of each of all other nodes within the same AMF set, the second information includes RC and one or more identifier, and the second information is pre-stored on the second AMF node; and selectively change backup AMF for at least one identifier of the second AMF based on the first information and the second information in an autonomous way, without the participation of the OAM.

In yet another embodiment, there proposes a computer readable medium comprising computer readable code, which when run on an apparatus, causes the apparatus to perform any of the above method.

With embodiments herein, the backup AMF information is determined per GUAMI granularity and published automatically among all AMFs within the AMF set in an autonomous way.

All the AMF members within an AMF set participate in the backup AMF information exchange without the cumbersome OAM intervention, making the AMF set an autonomous system. This is more in line with the requirement of a highly automated 5G core network as the OAM intervention is minimized.

5G-AN and other CP NFs including NRF and OAM are dynamically updated.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which.

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

The term "A, B, or C" used herein means "A" or "B" or "C"; the term "A, B, and C" used herein means "A" and "B" and "C"; the term "A, B, and/or C" used herein means "A", "B", "C", "A and B", "A and C", "B and C" or "A, B, and C".

In the embodiments herein, the backup AMF information is automatically updated and published among 5G core network and 5G-AN without cumbersome OAM intervention in case of AMF addition, AMF update, AMF planned removal, AMF failure and AMF recovery.

The embodiments herein minimizes the OAM operation and makes the AMF set more of an autonomous system. This is in line with the requirement of a highly automated 5G core network.

In case of AMF failure and AMF recovery, it's almost impossible for the OAM system to update the backup AMF information in a timely way.

Figure 1:
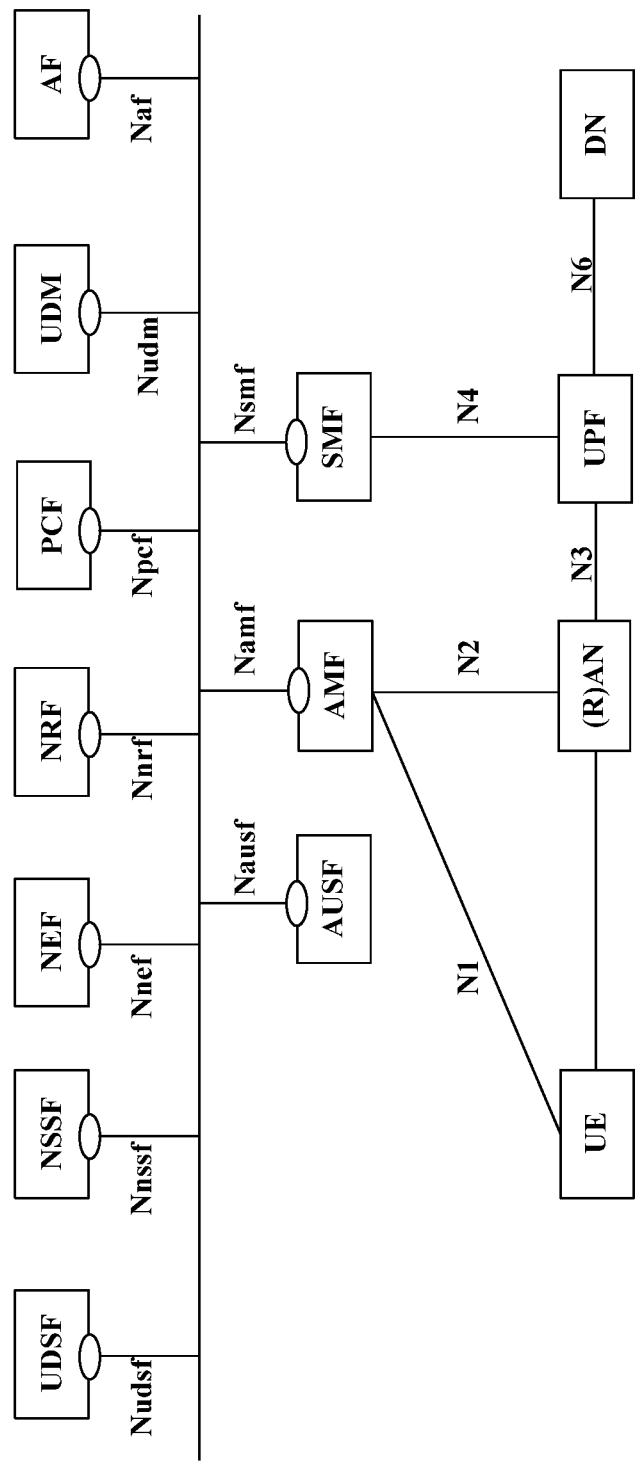
FIG. 1 is a schematic block diagram showing non-roaming reference architecture of 5G.
Figure 2:
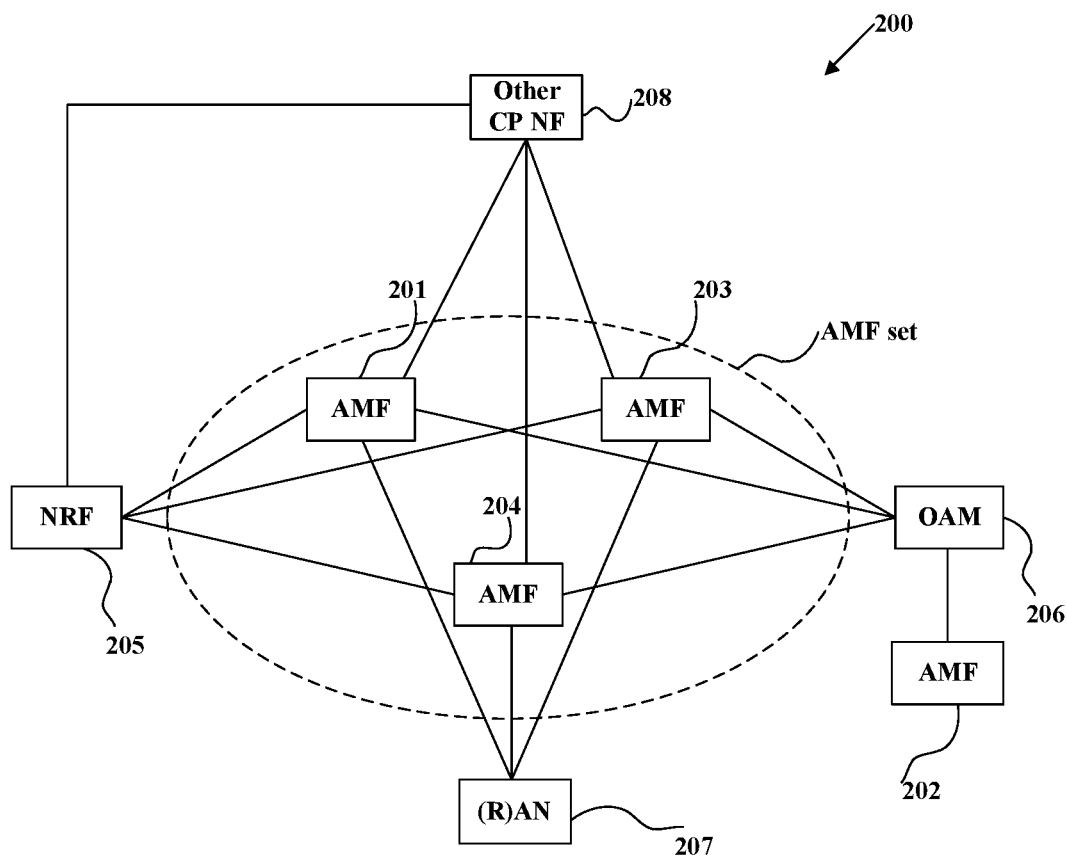
FIG. 2 is a schematic block diagram showing an example communication system, in which the embodiments herein can be implemented.

FIG. 2 is a schematic block diagram showing an example communication system 200, in which the embodiments herein can be implemented.

In one embodiment, the communication system 200 may include but not limit to a plurality of AMFs 201-204, an NRF node 205, an OAM node 206, an AN (e.g., RAN) node 207, and other CP NF 208. The AMFs 201, 203, 204 may be configured in an AMF set (shown in dashed line). Note that, the AMF set may include more or less AMFs.

In one embodiment, all AMFs 201, 203, 204 in the AMF set may couple to the NRF node 205, the OAM node 206, and other CP NF 208. In one embodiment, all AMFs 201, 203, 204 in the AMF set may couple to one AN node 207, but the present disclosure does not limit to this case.

To solve the problem in the prior art, the following embodiments are proposed.

<Initial AMF Deployment>

In this case, the OAM 206 initially deploys AMFs 201, 203, 204 within the AMF set. Each of AMFs 201, 203, 204 can be seen as the first AMF node, for which a variation will occurs. There is no second AMF node, which is an existing node.

According to 3GPP TS 23.003-V15.2.0, the AMF pointer has 4 bits long. This means that there can be at most 16 AMFs within an AMF set. So, within an AMF set, the value range of the AMF pointer is:

0, 1, 2, 3, 4, 5, 6, 7, 8, 9, 10, 11, 12, 13, 14, 15.

During initial deployment of an AMF set, each AMF is assigned a RC (Relative Capacity) and one or several GUAMIs or AMF pointers through OAM operation.

During initial deployment, each AMF is also provided a list of all other AMFs within the AMF set by OAM but no backup AMF information is configured through OAM during initial AMF deployment.

Instead, each AMF determines which other AMF within the AMF set can be the backup AMF on GUAMI granularity based on AMF Relative Capacity. It is possible that one AMF is selected as the backup AMF for several GUAMIs.

During AMF startup, each AMF perform NF Service Registration towards NRF. The association between GUAMI(s) and AMF as well as the backup AMF information is published to NRF.

Figure 3:
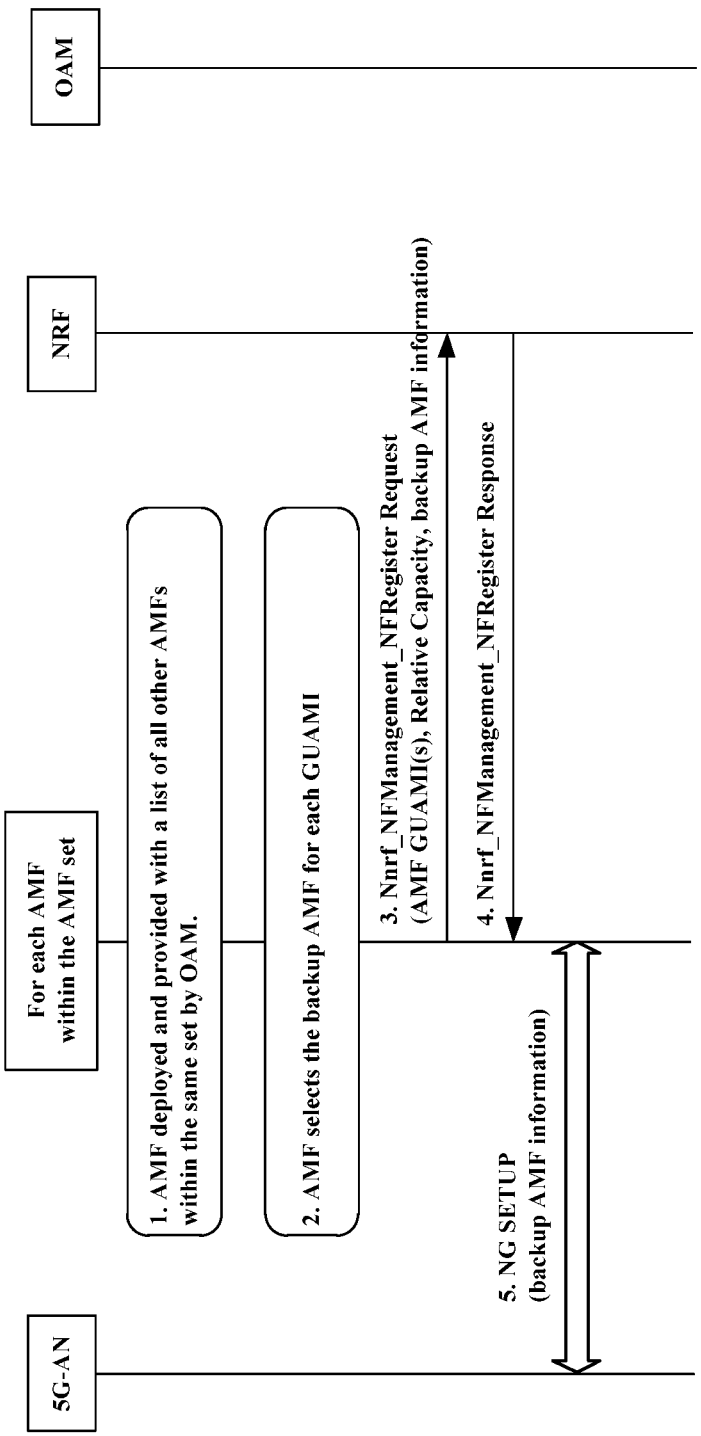
FIG. 3 is a schematic signaling chart showing the messages in the initial AMF deployment.

FIG. 3 is a schematic signaling chart showing the messages in the initial

AMF deployment, which comprising the following steps 1-5.

1. OAM starts to deploy new AMFs.

Each AMF (i.e., the first AMF node, for example AMF 201, 203, or 204) is assigned one Relative Capacity, one or more GUAMIs.

Each AMF is provided a list of all other AMFs (Relative Capacity, GUAMIs) within the same AMF set.

2. Each AMF starts up. The AMF determines the backup AMF for each GUAMI assigned to this AMF. The determination can be done through a weighted round robin algorithm among all other available AMFs based on the Relative Capacity of each AMF or through a random way or through some other algorithms.

3. Each AMF performs the NF Service Registration procedure towards NRF such as NRF 205.

The association between GUAMI(s) and AMF as well as the backup AMF information is published to NRF.

Each AMF subscribes NRF to the AMF change notification as part of the NF Service Registration procedure.

4. The NRF acknowledges the AMF NF Service Registration. If the NRF is collocated with the DNS server, the NRF updates its DNS records including the backup AMF information for interworking between 5GS and EPC/E-UTRAN when the MME needs to find the AMF during mobility from 5GS to EPC/E-UTRAN.

If the NRF is not collocated with the DNS server, the NRF could utilize the DNS Dynamic Updates mechanism described in RFC 2136 to add the AMF and the backup AMF information into DNS.

5. During NG SETUP procedure, the AMF provides the backup AMF information to the 5G-AN such as AN 207.

Backup AMF Information Update

<AMF Addition>

In this case, the OAM 206 adds AMF 202 within the AMF set. The AMF 202 can be seen as the first AMF node, for which a variation will occurs. Each of the AMFs 201, 203, 204 can be seen as the second AMF node, which is an existing node.

Figure 4:
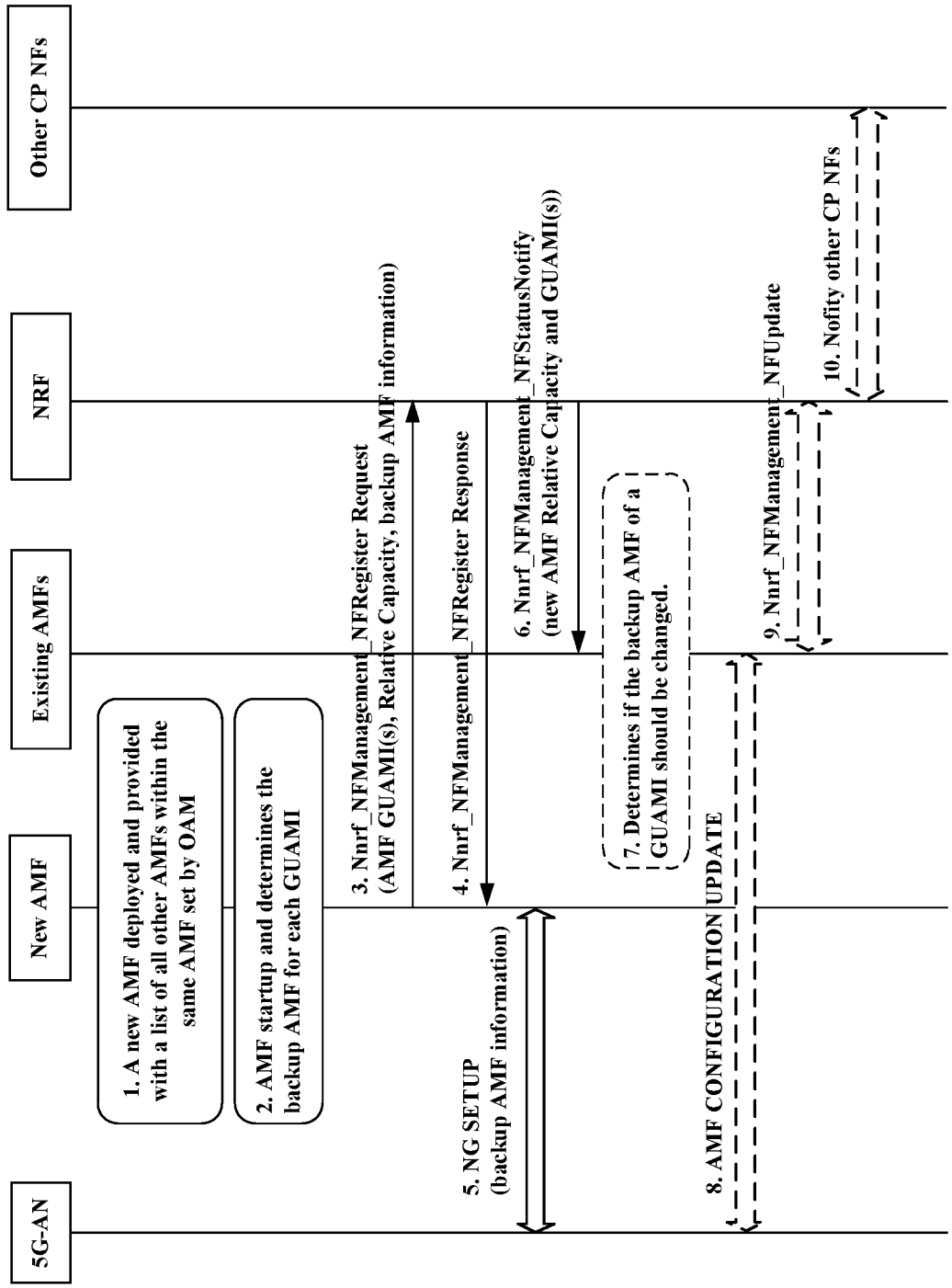
FIG. 4 is a schematic signaling chart showing the messages in AMF addition.

FIG. 4 is a schematic signaling chart showing the messages in AMF addition, which comprising the following steps 1-10.

1. OAM decides to deploy a new AMF (i.e., the first AMF node, for example AMF 202) within an AMF set. The AMF is assigned one Relative Capacity, one or more GUAMIs.

The AMF is also provided a list of all other AMFs of the same AMF set.

2. The new AMF determines the backup AMF for each GUAMI assigned to this AMF.

3. The new AMF performs the NF Service Registration procedure towards NRF such as NRF 205.

The association between GUAMI(s) and AMF as well as the backup AMF information is published to NRF.

The new AMF subscribes NRF to the AMF change notification as part of the NF Service Registration procedure.

4. The NRF acknowledges the AMF NF Service Registration.

If the NRF is collocated with the DNS server, the NRF updates its DNS records including the backup AMF information for interworking between 5GS and EPC/E-UTRAN when the MME needs to find the AMF during mobility from 5GS to EPC/E-UTRAN.

If the NRF is not collocated with the DNS server, the NRF could utilize the DNS Dynamic Updates mechanism described in RFC 2136 to add the new AMF and the backup AMF information into DNS.

5. During NG SETUP procedure, the AMF provides the backup AMF information to the 5G-AN, such as AN 207.

6. The NRF notifies the other AMFs (i.e., the second AMF node, for example AMF 201, 203, or 204) that a new AMF is added into the AMF set.

The NRF includes the new AMF Relative Capacity and the GUAMIs assigned to the new AMF.

7. Optionally the existing AMFs within the AMF set decide if the backup AMF shall be changed.

8. If the existing AMFs decides that the backup AMF shall be changed for one or more GUAMIs, the AMF triggers the NGAP AMF CONFIGURATION UPDATE procedure to update the 5G-AN with the new backup AMF information.

If the backup AMF is changed, the update to other CP NFs 208 can be done upon next NF communication.

9. If the existing AMFs decides that the backup AMF shall be changed for one or more GUAMIs, the AMF performs the NF Service Update procedure towards NRF.

10. The NRF may notify other CP NFs about the new backup AMF information.

<AMF Update>

In this case, the OAM 206 updates AMF 201 within the AMF set. The AMF 201 can be seen as the first AMF node, for which a variation will occur. Each of the AMFs 203 and 204 can be seen as the second AMF node, which is an existing node.

Figure 5:
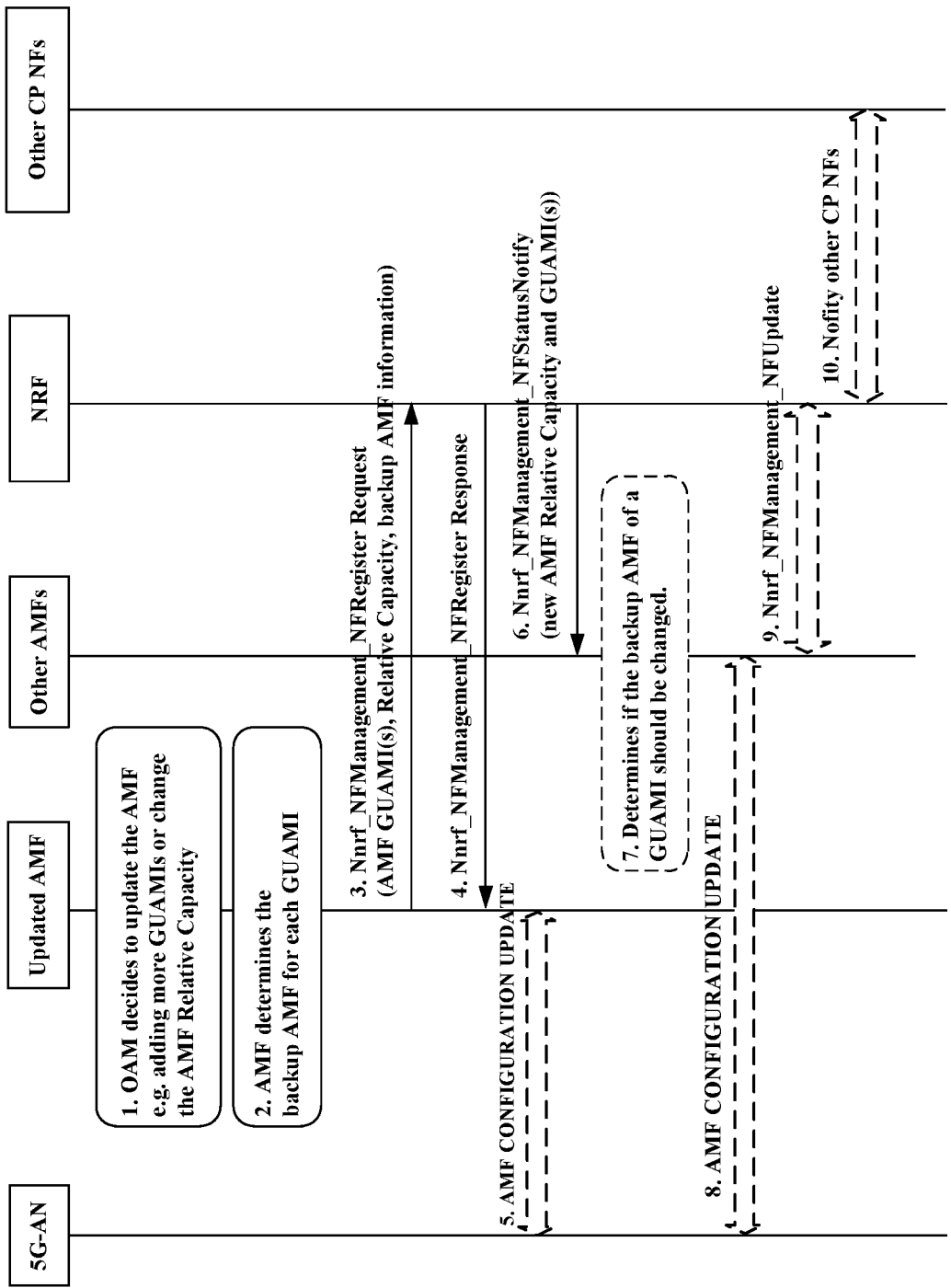
FIG. 5 is a schematic signaling chart showing the messages in AMF update.

FIG. 5 is a schematic signaling chart showing the messages in AMF update, which comprising the following steps 1-10.

1. OAM decides to update one AMF (i.e., the first AMF node, for example AMF 201) within an AMF set.

For example, to change the AMF Relative Capacity or assign more GUAMIs.

2. The AMF determines the backup AMF for each GUAMI assigned to this AMF.

3. The AMF if needed, performs the NF Service Registration Update procedure towards NRF such as NRF 205.

4. The NRF acknowledges the AMF NF Service Registration Update.

5. If needed, the AMF updates the 5G-AN such as AN 207 about the new AMF information (e.g. AMF Relative Capacity, new AMF backup information, new GUAMIs).

An example is that the AMF is assigned a new GUAMI so the AMF will select a backup AMF for that new GUAMI. Then the 5G-AN needs to be updated with both the new GUAMI and its associated backup AMF information.

6. The NRF notifies the other AMFs (i.e., the second AMF node, for example AMF 203, or 204) that one AMF is updated.

The NRF includes the updated AMF Relative Capacity and its GUAMIs.

7. Optionally the other AMFs within the AMF set can decide if the backup AMF shall be changed.

8. If the other AMFs decides that the backup AMF shall be changed for one or more GUAMIs, the AMF triggers the NGAP AMF CONFIGURATION UPDATE procedure to update the 5G-AN with the new backup AMF information.

If the backup AMF is changed, the update to other CP NFs 208 can be done upon next NF communication.

9. If the other AMFs decides that the backup AMF shall be changed for one or more GUAMIs, the AMF performs the NF Service Update procedure towards NRF.

10. The NRF may notify other CP NFs about the new backup AMF information.

<AMF Planned Removal>

In this case, the OAM 206 removes AMF 201 from the AMF set. The AMF 201 can be seen as the first AMF node, for which a variation will occur. Each of AMFs 203 and 204 can be seen as the second AMF node, which is an existing node.

Figure 6:
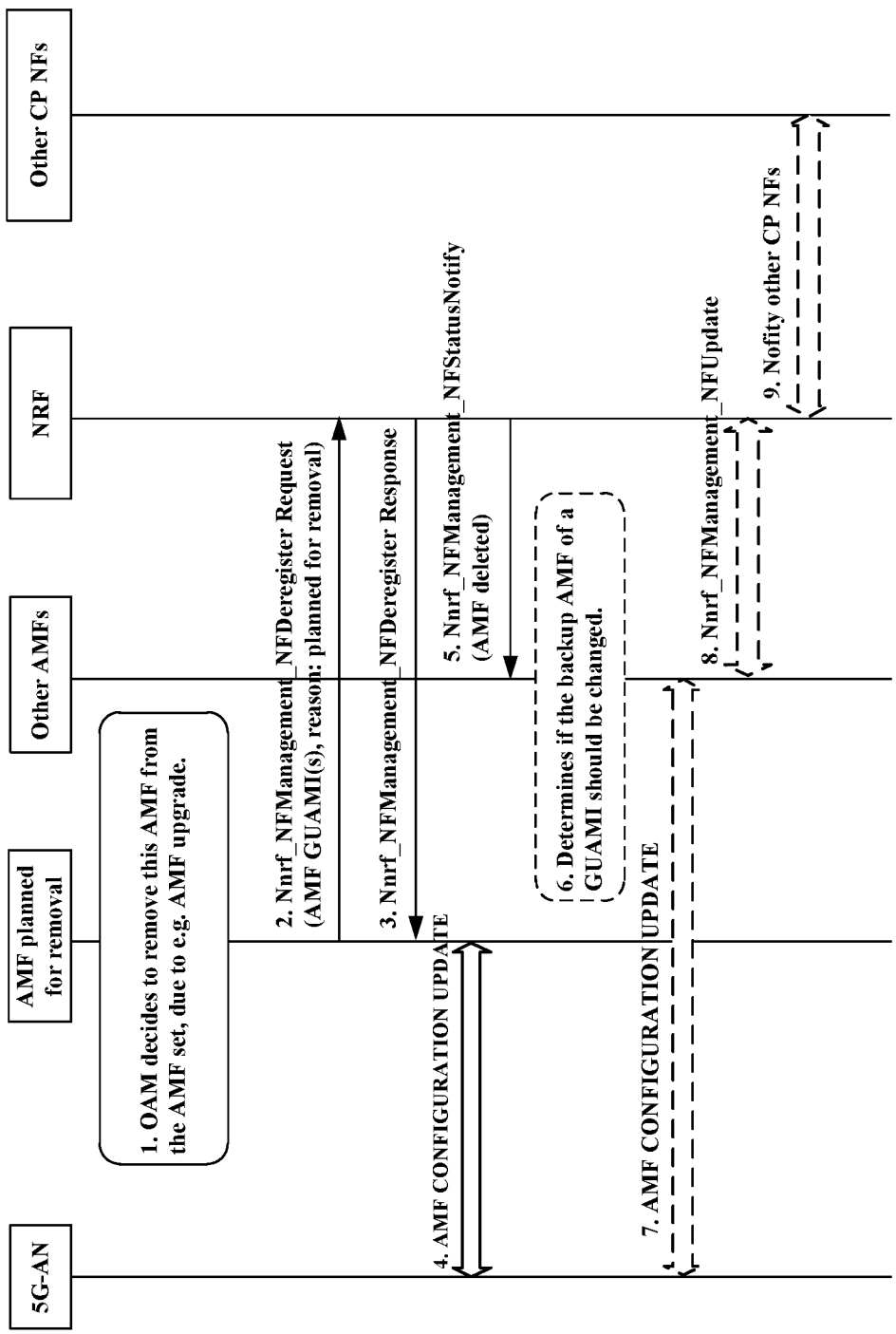
FIG. 6 is a schematic signaling chart showing the messages in AMF planned removal.

FIG. 6 is a schematic signaling chart showing the messages in AMF planned removal, which comprising the following steps 1-9.

1. OAM decides to remove one AMF (i.e., the first AMF node, for example AMF 201) from the AMF set due to e.g. AMF upgrade.

Note: if one AMF is removed from the AMF set, the backup UE contexts on that AMF are also lost. Therefore, a new backup AMF needs to be selected by other AMFs for the affected GUAMIs.

2. The AMF planned for removal deregister itself from NRF indicating due to AMF planned removal by sending a Nnrf_NFManagement_NFDeregister Request with AMF GUAMIs included. The AMF GUAMIs serve as the AMF ID.

3. The NRF such as NRF 205 acknowledges the AMF NF deregistration.

4. As described in 3GPP TS 23.501-V15.0.0, clause 5.21.2.2.1, the AMF notifies the 5G-AN that it will be unavailable for processing transactions by including GUAMI(s) configured on this AMF through the NGAP AMF CONFIGURATION UPDATE procedure.

5. The NRF notifies other AMFs (i.e., the second AMF node, for example AMF 203, or 204) that one AMF is removed from the AMF set.

The NRF includes the GUAMIs of the AMF planned for removal in the notification message.

6. The other AMFs, upon NRF notification, check if the AMF that has been removed from the AMF set is serving as backup AMF of one or more GUAMIs.

If the other AMFs find out the AMF that is removed from the AMF set is serving as backup AMF of one or more GUAMIs, the other AMFs select a new backup AMF for the GUAMIs.

The other AMFs can optionally decide to select a new backup AMF even if the AMF that has been removed from the AMF set is not serving as the backup AMF of any GUAMI since the AMF set topology is change.

7. If the backup AMF information is changed, the other AMFs trigger the NGAP AMF CONFIGURATION UPDATE procedure to update the 5G-AN such as AN 207 about the new backup AMF.

8. If the other AMFs decides that the backup AMF shall be changed for one or more GUAMIs, the AMF performs the NF Service Update procedure towards NRF.

9. The NRF may notify other CP NFs 208 about the new backup AMF information.

<AMF Failure>

In this case, AMF 201 fails. The AMF 201 can be seen as the first AMF node, for which a variation will occur. Each of the AMFs 203 and 204 can be seen as the second AMF node, which is an existing node.

Figure 7:
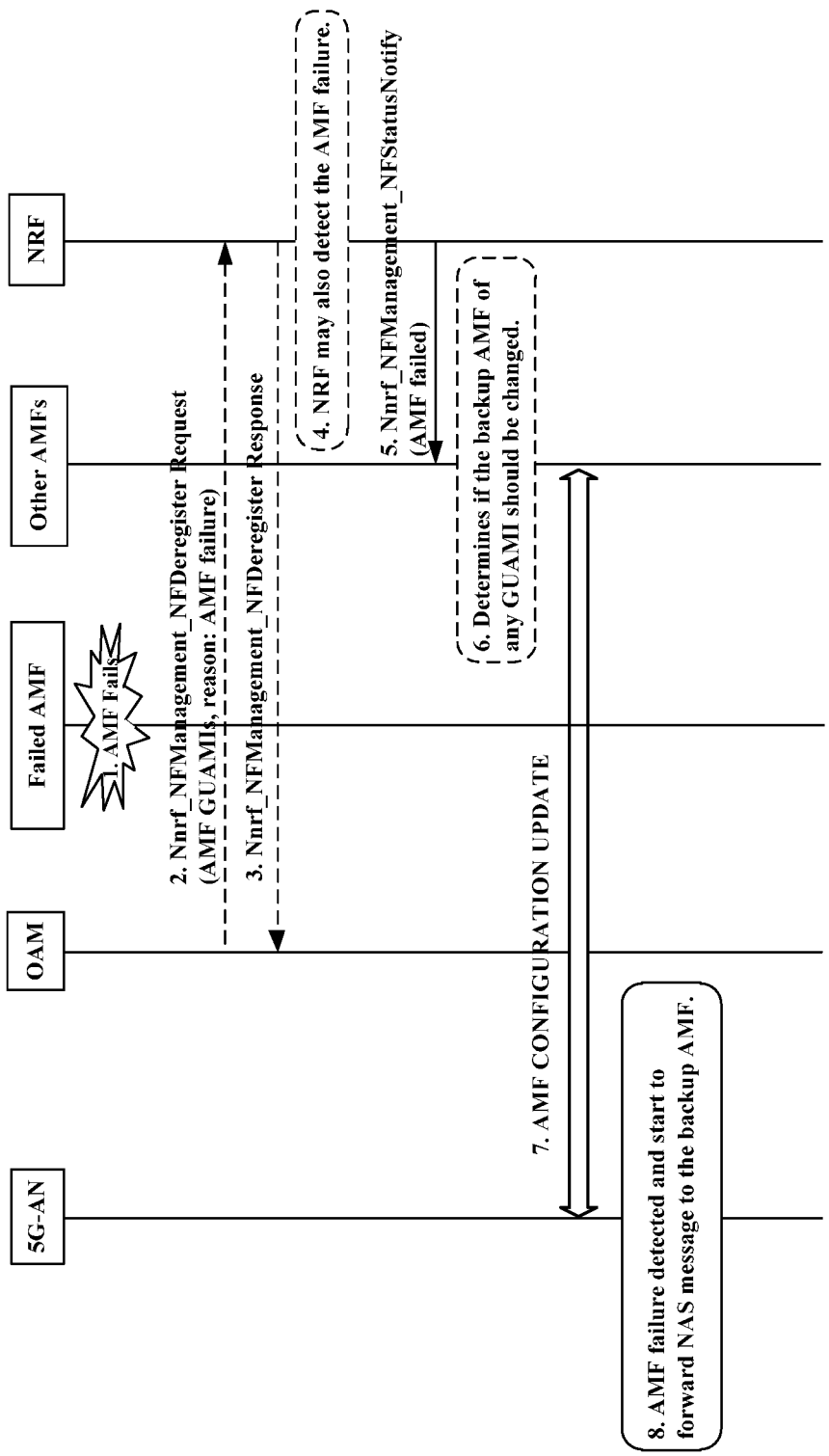
FIG. 7 is a schematic signaling chart showing the messages in AMF failure.

FIG. 7 is a schematic signaling chart showing the messages in AMF failure, which comprising the following steps 1-8.

1. An AMF failure happens.

Note: All backup UE contexts on the failed AMF (i.e., the first AMF node, for example AMF 201) are lost. A new backup AMF needs to be selected for affected GUAMIs on other AMFs (i.e., the second AMF node, for example AMF 203, or 204).

2. As described in 3GPP TS 23.501-V15.0.0, clause 5.21.2.3, the OAM 206 may deregister the AMF from NRF such as AMF 205 indicating due to AMF failure.

3. The NRF acknowledges the NF deregistration request if received from OAM.

4. The NRF may also have detected the AMF failure.

5. The NRF notifies other AMFs that one AMF has failed.

The NRF includes the GUAMIs of the failed AMF.

6. The other AMFs, upon NRF notification, check if the failed AMF is serving as backup AMF of one or more GUAMIs.

If the other AMFs find out the failed AMF is serving as backup AMF of one or more GUAMIs, the other AMFs select a new backup AMF for the GUAMIs.

The other AMFs can optionally decide to select a new backup AMF even if the failed AMF is not serving as the backup AMF of any GUAMI since the AMF set topology is changed.

7. If the backup AMF information is changed, the other AMFs trigger the NGAP AMF CONFIGURATION UPDATE procedure to update the 5G-AN such as AN 207 about the new backup AMF.

The other AMFs also update NRF with the new backup AMF information. NRF then may notify other CP NFs 208 about the new backup AMF information if other CP NFs have subscribed to receive such notification.

8. The 5G-AN detects the AMF failure and starts to forward NAS message to the backup AMF.

<AMF Recovery>

In this case, AMF 201 recovers from failure. The AMF 201 can be seen as the first AMF node, for which a variation will occur. Each of the AMFs 203 and 204 can be seen as the second AMF node, which is an existing node.

Figure 8:
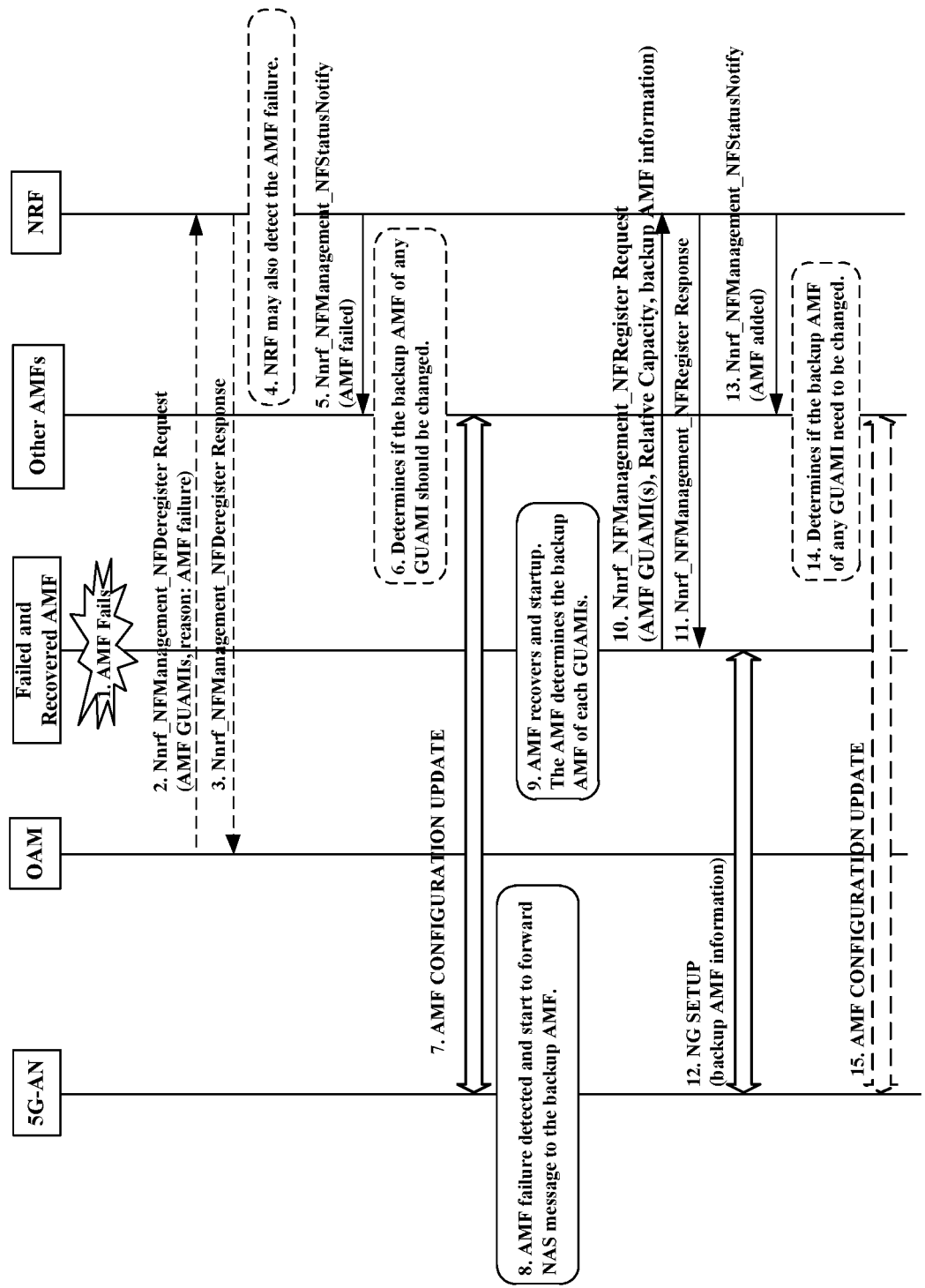
FIG. 8 is a schematic signaling chart showing the messages in AMF recovery.

FIG. 8 is a schematic signaling chart showing the messages in AMF recovery, which comprising the following steps 1-15.

1. An AMF failure happens.

Note: All backup UE contexts on the failed AMF (i.e., the first AMF node, for example AMF 201) are lost. A new backup AMF needs to be selected for affected GUAMIs on other AMFs (i.e., the second AMF node, for example AMF 203, or 204).

2. As described in 3GPP TS 23.501-V15.0.0, clause 5.21.2.3, the OAM 206 may deregister the AMF from NRF such as NRF 205 indicating due to AMF failure.

3. The NRF acknowledges the NF deregistration request if received from OAM.

4. The NRF may also have detected the AMF failure.

5. The NRF notifies other AMFs that one AMF has failed. The NRF includes the GUAMIs of the failed AMF.

6. The other AMFs, upon NRF notification, check if the failed AMF is serving as backup AMF of one or more GUAMIs.

If the other AMFs find out the failed AMF is serving as backup AMF of one or more GUAMIs, the other AMFs select a new backup AMF for the GUAMIs.

The other AMFs can optionally decide to select a new backup AMF even if the failed AMF is not serving as the backup AMF of any GUAMI since the AMF set topology is changed.

7. If the backup AMF information is changed, the other AMFs trigger the NGAP AMF CONFIGURATION UPDATE procedure to update the 5G-AN such as AN 207 about the new backup AMF.

The other AMFs also update NRF with the new backup AMF information. NRF then may notify other CP NFs 208 about the new backup AMF information if other CP NFs have subscribed to receive such notification.

8. The 5G-AN detects the AMF failure and starts to forward NAS message to the backup AMF.

9. The failed AMF has now recovered from the failure. The recovered AMF determines the backup AMF of each GUAMI.

10. The recovered AMF performs the NF Service Registration procedure towards NRF.

The association between GUAMI(s) and AMF as well as the backup AMF information is published to NRF.

The AMF also subscribes NRF to the AMF change notification as part of the NF Service Registration procedure.

11. The NRF acknowledges the AMF NF Service Registration.

If the NRF is collocated with the DNS server, the NRF updates its DNS records including the backup AMF information for interworking between 5GS and EPC/E-UTRAN when the MME needs to find the AMF during mobility from 5GS to EPC/E-UTRAN.

If the NRF is not collocated with the DNS server, the NRF could utilize the DNS Dynamic Updates mechanism described in RFC 2136 to add the new AMF and the backup AMF information into DNS.

12. The 5G-AN detects the AMF has recovered and triggers NG SETUP procedure.

The AMF provides backup AMF information in the NG SETUP RESPONSE.

13. The NRF notifies the other AMFs that a new AMF is added into the AMF set.

The NRF includes the new AMF Relative Capacity and the GUAMIs assigned to the new AMF.

14. Optionally the existing AMFs within the AMF set can decide if the backup AMF shall be changed.

15. If the existing AMFs decides that the backup AMF shall be changed for one or more GUAMIs, the AMF triggers the NGAP AMF CONFIGURATION UPDATE procedure to update the 5G-AN with the new backup AMF information.

If the backup AMF is changed, the update to other CP NFs is done upon next NF communication.

With embodiments herein, the backup AMF information is determined per GUAMI granularity and published automatically among all AMFs within the AMF set in an autonomous way.

Figure 9:
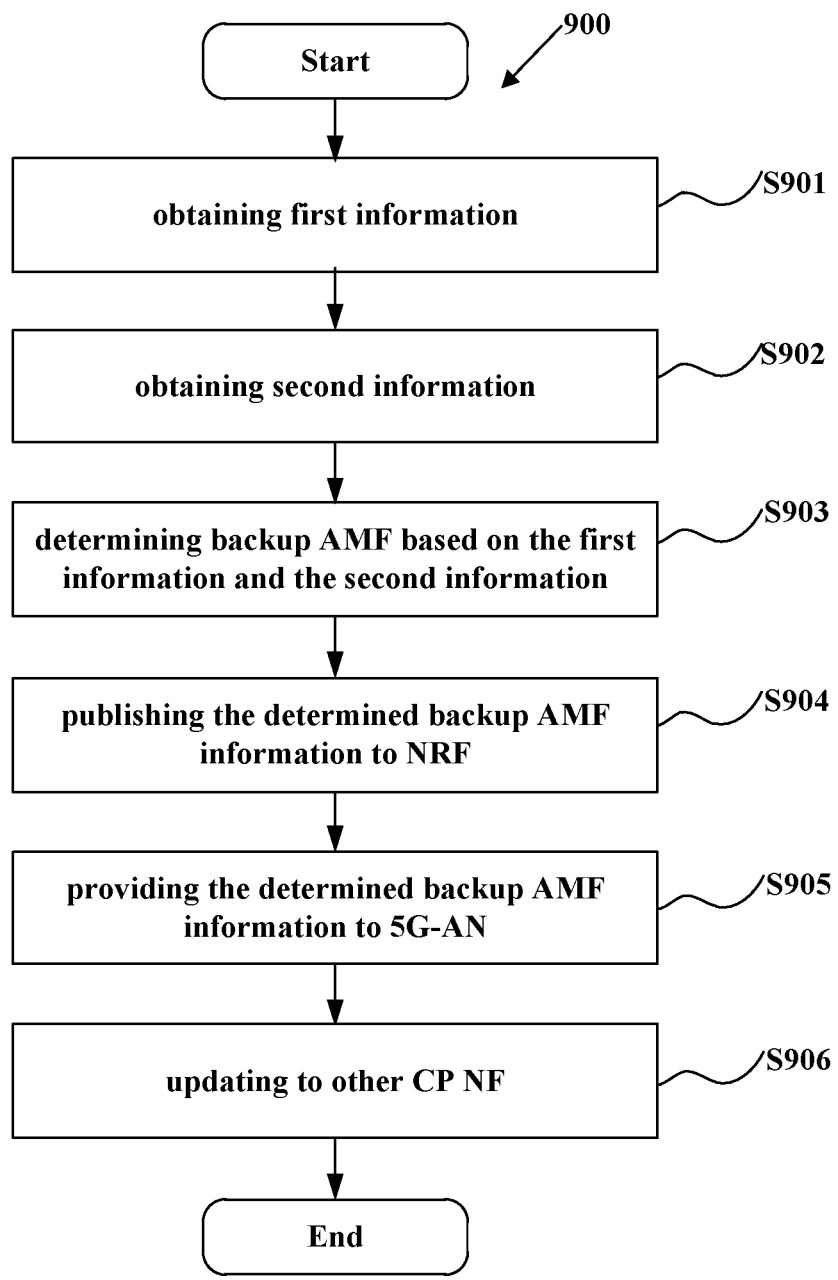
FIG. 9 is a schematic flow chart showing an example method in the first AMF node, according to the embodiments herein.

FIG. 9 is a schematic flow chart showing an example method 900 in the first AMF node, according to the embodiments herein. In one embodiment, the flow chart in FIG. 9 can be implemented in the first AMF node in FIG. 2.

The first AMF node may be, for example but not limit to, AMF 201, 203, 204 in AMF initial deployment case, AMF 202 in AMF addition case, or AMF 201 in AMF update case, AMF planned removal case, AMF failure case, and AMF recovery case.

The method 900 may begin with step S901, in which the first AMF node may obtain first information of the first AMF node, the first information at least includes one or more identifier (for example GUAMI), but may further include RC in some cases.

In one embodiment, for AMF initial deployment case shown in FIG. 3, in which the OAM 206 initially deploys the set of AMF, the step of obtaining the first information may include receiving RC and one or more identifier of the first AMF node from the OAM 206.

In one embodiment, for AMF addition case shown in FIG. 4, in which the OAM 206 adds the first AMF node into the AMF set, the step of obtaining the first information may include receiving RC and one or more identifier of the first AMF node from the OAM 206.

In one embodiment, for AMF update case shown in FIG. 5, in which the OAM 206 updates the first AMF node by changing its RC and/or identifier, the step of obtaining the first information may include receiving the first information from the OAM 206.

In a further embodiment, for AMF update case shown in FIG. 5, in which the OAM 206 may update RC of the first AMF node, the step of obtaining the first information may include receiving the updated RC and one or more identifier from the OAM 206.

In still a further embodiment, for AMF update case shown in FIG. 5, in which the OAM 206 assigns at least one additional identifier to the first AMF node, the step of obtaining the first information may include receiving the at least one additional identifier from the OAM 206.

In one embodiment, for AMF recovery case shown in FIG. 8, in which the first AMF node recovers from failure, the step of obtaining the first information may include retrieving RC and one or more identifier of the first AMF node pre-stored on the first AMF node.

Then, the method 900 may proceed to step S902, in which the first AMF node may obtaining second information of each of all other nodes within the same AMF set as the first AMF node, the second information includes RC and one or more identifier (for example GUAMI).

In one embodiment, for AMF initial deployment case shown in FIG. 3, in which the OAM 206 initially deploys the set of AMF, the step of obtaining the second information may include receiving the second information from the OAM 206.

In one embodiment, for AMF addition case shown in FIG. 4, in which the OAM 206 adds the first AMF node into the AMF set, the step of obtaining the second information may include receiving the second information from the OAM 206.

In one embodiment, for AMF update case shown in FIG. 8, in which the OAM updates the first AMF node by changing its RC and/or identifier, the step of obtain the second information may include retrieving the second information pre-stored on the first AMF node.

In one embodiment, for AMF recovery case shown in FIG. 5, in which the first AMF node recovers from failure, the step of obtaining the second information may include retrieving the second information pre-stored on the first AMF node.

Then, the method 900 may proceed to step S903, in which the first AMF node may determine backup AMF for at least one identifier (for example GUAMI) of the first AMF based on the first information and the second information in an autonomous way, without the participation of the OAM such as OAM node 206.

In one embodiment, for AMF update case shown in FIG. 5, in which the OAM 206 assigns at least one additional identifier to the first AMF node, the step of determining backup AMF may include determining backup AMF for the at least one additional identifier of the first AMF.

In one embodiment, the above mentioned determination of backup AMF is performed through a weighted round robin algorithm based on the Relative Capacity of each AMF or through a random way, or any other way.

Then, the method 900 may proceed to step S904, in which the first AMF node may publish the association between one or more identifier and the first AMF as well as the determined backup AMF information to NRF such as the NRF node 205 via NF service Registration procedure. Also, the second AMF node may receive NF service registration response indicating whether the NF service registration is successful.

In one embodiment, for AMF initial deployment case shown in FIG. 3, AMF addition case shown in FIG. 4, and AMF recovery case shown in FIG. 8, the first AMF node may subscribe NRF to the AMF change notification as part of the NF Service Registration procedure.

Then, the method 900 may proceed to step S905, in which the first AMF node may provide the determined backup AMF information to the 5G AN such as AN 207.

In one embodiment, for AMF initial deployment case shown in FIG. 3, AMF addition case shown in FIG. 4, and AMF recovery case shown in FIG. 8, the first AMF node may provide the determined backup AMF information to the 5G AN such as AN 207 via NG SETUP procedure.

Also, in another embodiment, for AMF update case shown in FIG. 5, the first AMF node may provide the updated RC and identifier, together with the determined backup AMF information to the 5G AN such as AN 207 via AMF CONFIGURATION UPDATE procedure.

Note that, the above steps S904 and S905 can be perform in any manner, for example, performed in any sequence, performed at the same time, or performed separately.

Then, the method 900 may proceed to step S906, in which the first AMF node may update to other CP NF 208 upon next NF communication, if any backup AMF has been changed.

In one embodiment, the AMFs in the same set have a same AMF Set ID but different AMF Pointers. Also, the identifier is GUAMI. Still, the RC can be relative capacity per AMF or relative capacity per GUAMI.

The above steps are only examples, and the first AMF node can perform any respective actions described in connection to FIGS. 3-8, to update the backup AMF, and notifies NRF, AN, and other CP NF in an autonomous way.

Figure 10:
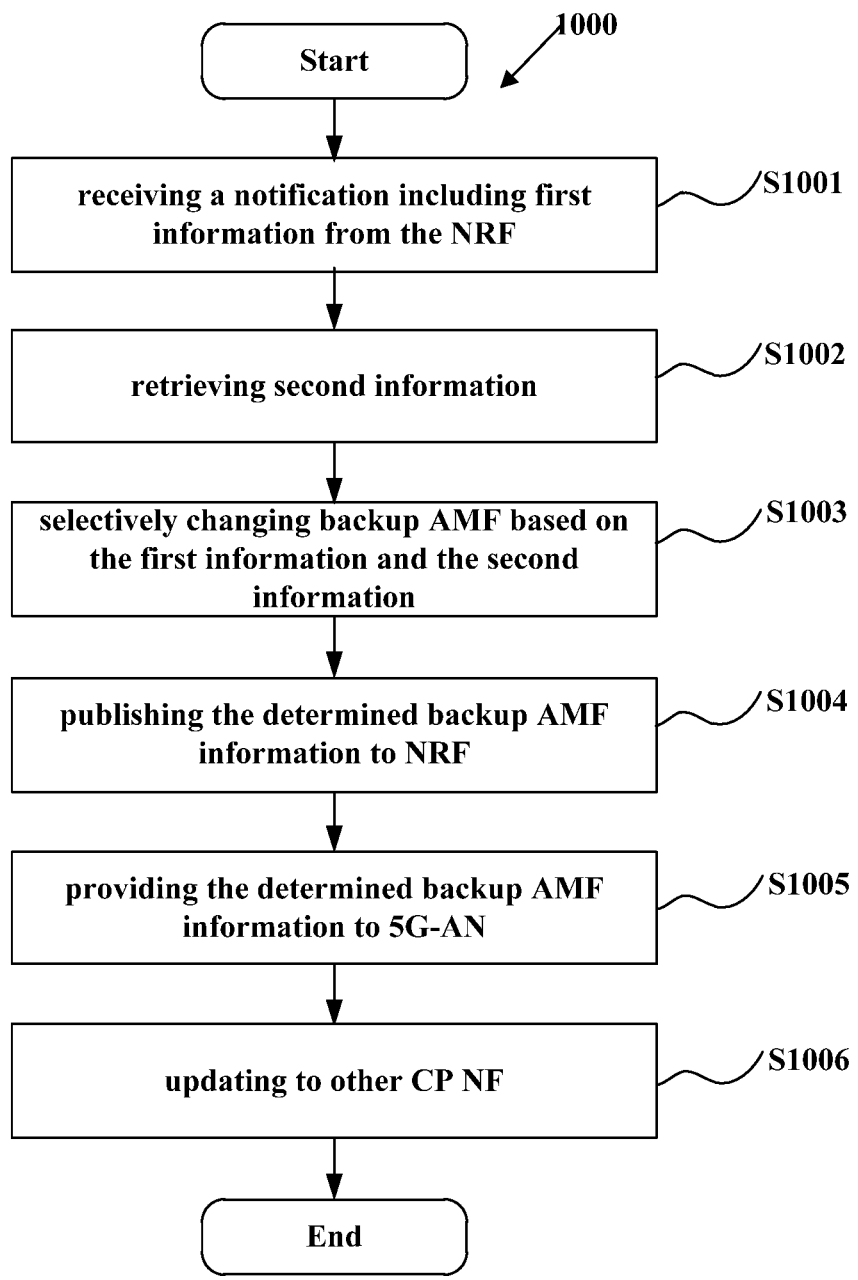
FIG. 10 is a schematic flow chart showing an example method in the second AMF node, according to the embodiments herein.

FIG. 10 is a schematic flow chart showing an example method 1000 in the second AMF node, according to the embodiments herein. In one embodiment, the flow chart in FIG. 10 can be implemented in the second AMF node in FIG. 2 (for example but not limit to, AMF 201, 203, 204 in AMF addition case, or AMF 203, 204 in AMF update case, AMF planned removal case, AMF failure case, and AMF recovery case). In one embodiment, the second AMF node, as existing node, has been assigned one or more identifier (for example GUAMI), and backup AMF has been determined for each of the one or more identifier.

The method 1000 may begin with step S1001, in which the second AMF node may receive a notification indicating a variation of a first AMF node from the NRF such as the NRF node 205, the notification includes first information of the first AMF node, the first information at least includes one or more identifier, but may further include RC in some cases.

In one embodiment, for AMF addition case shown in FIG. 4, in which the OAM 206 adds the first AMF node into the AMF set, the notification may indicate the addition of the first AMF node, and the first information may include RC and one or more identifier of the first AMF node. In one embodiment, for AMF update case shown in FIG. 5, in which the OAM 206 updates the first AMF node by changing its RC and/or identifier, the notification may indicate the update of the first AMF node.

In a further embodiment, for AMF update case shown in FIG. 5, in which the OAM 206 updates RC of the first AMF node, the first information may include RC and one or more identifier of the first AMF node.

In still a further embodiment, for AMF update case shown in FIG. 5, in which the OAM 206 assigns at least one additional identifier to the first AMF node, the first information includes the at least one additional identifier of the first AMF node.

In still a further embodiment, for AMF update case shown in FIG. 5, in which the OAM 206 deletes at least one identifier of the first AMF node, the first information may include the at least one identifier to be deleted.

In one embodiment, for AMF planned removal case shown in FIG. 6, in which the OAM 206 removes the first AMF node from the AMF set, the notification may indicate the removal of the first AMF node, and the first information may include one or more identifier of the first AMF node.

In one embodiment, for AMF failure case shown in FIG. 7, in which the first AMF node fails, the notification may indicate the failure of the first AMF node, and the first information may include one or more identifier of the first AMF node.

In one embodiment, for AMF recovery case shown in FIG. 8, in which the first AMF node recovers from failure, the notification may indicate the recovery of the first AMF node, and the first information may include RC and one or more identifier of the first AMF node.

Then, the method 1000 may proceed to step S1002, in which the second AMF node may retrieve second information of each of all other nodes within the same AMF set, the second information includes RC and one or more identifier, and the second information is pre-stored on the second AMF node.

Then, the method 1000 may proceed to step S1003, in which the second AMF node may selectively changing backup AMF for at least one identifier of the second AMF based on the first information and the second information in an autonomous way, without the participation of the OAM such as the OAM node 206.

In one embodiment, for AMF removal case shown in FIG. 6, in which the OAM 206 removes the first AMF node from the AMF set, the notification may indicate the removal of the first AMF node, and the step of selectively changing backup AMF may include selecting new backup AMF for at least one identifier of the second AMF node, if the AMF that is removed from the AMF set is serving as backup AMF of the at least one identifier.

In another embodiment, for AMF removal case shown in FIG. 6, in which the OAM 206 removes the first AMF node from the AMF set, the notification may indicate the removal of the first AMF node, and the step of selectively changing backup AMF may include selecting new backup AMF for at least one identifier of the second AMF node, even the AMF that is removed from the AMF set is not serving as backup AMF of the at least one identifier.

In one embodiment, for AMF failure case shown in FIG. 7, in which the first AMF node fails, the notification may indicate the failure of the first AMF node, and the step of selectively changing backup AMF may include selecting new backup AMF for at least one identifier of the second AMF node, if the failed AMF is serving as backup AMF of the at least one identifier.

In another embodiment, for AMF failure case shown in FIG. 7, in which the first AMF node fails, the notification may indicate the failure of the first AMF node, and the step of selectively changing backup AMF may include selecting new backup AMF for at least one identifier of the second AMF node, even the failed AMF is not serving as backup AMF of the at least one identifier.

In one embodiment, the determination of backup AMF is performed through a weighted round robin algorithm based on the Relative Capacity of each AMF or through a random way, or any other way.

Then, the method 1000 may proceed to step S1004, in which the second AMF node may publish the association between one or more identifier and the first AMF as well as the determined backup AMF information to NRF 205 via NF service Registration procedure. Also, the second AMF node may receive NF service registration response indicating whether the NF service registration is successful.

In one embodiment, the second AMF may perform NF service Update procedure towards NRF 205 for further notifying other CP NF 208, if any backup AMF has been changed.

Then, the method 1000 may proceed to step S1005, in which the second AMF node may provide the determined backup AMF information to the 5G AN such as AN 207 via NGAP AMF CONFIGURATION UPDATE procedure, if any backup AMF has been changed.

Note that, the above steps S1004 and S1005 can be perform in any manner, for example, performed in any sequence, performed at the same time, or performed separately.

Then, the method 1000 may proceed to step S1006, in which the second AMF node may update to other CP NF 208 upon next NF communication, if any backup AMF has been changed.

In one embodiment, the AMFs in the same set have a same AMF Set ID but different AMF Pointers. Also, the identifier is GUAMI. Still, the RC can be relative capacity per AMF or relative capacity per GUAMI.

Figure 11:
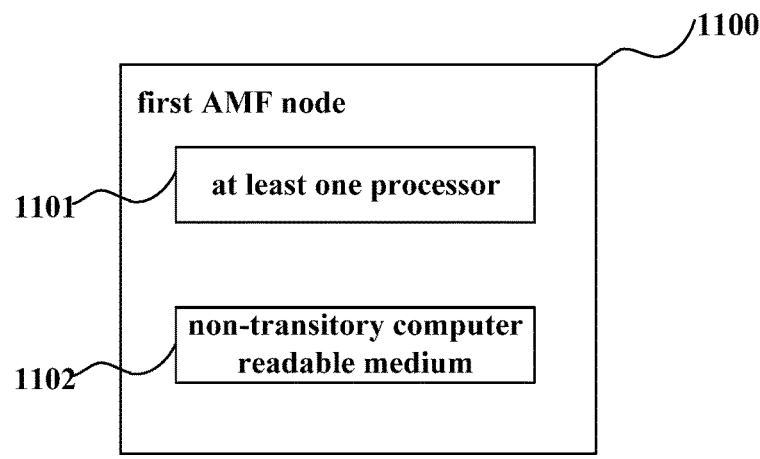
FIG. 11 is a schematic block diagram showing an example first AMF node, according to the embodiments herein.

The above steps are only examples, and the second AMF node can perform any respective actions described in connection to FIGS. 3-8, to update the backup AMF, and notifies NRF, AN, and other CP NF in an autonomous way, in response to the variation of the first AMF node. FIG. 11 is a schematic block diagram showing an example first AMF node 1100, according to the embodiments herein. The first AMF node 1100 may be one detailed implement form of the first AMF node shown in FIG. 2.

In one embodiment, the first AMF node 1100 may include at least one processor 1101; and a non-transitory computer readable medium 1102 coupled to the at least one processor 1101. The non-transitory computer readable medium 1102 contains instructions executable by the at least one processor 1101, whereby the at least one processor 1101 is configured to perform the steps in the example method 900 as shown in the schematic flow chart of FIG. 9; the details thereof is omitted here.

Note that, the first AMF node 1100 can be performed as hardware, software, firmware and any combination thereof. For example, the first AMF node 1100 may include a plurality of units, circuities, modules or the like, each of which can be used to perform one or more step of the example method 900 or one or more step shown in FIG. 3-8 related to the first AMF node.

Figure 12:
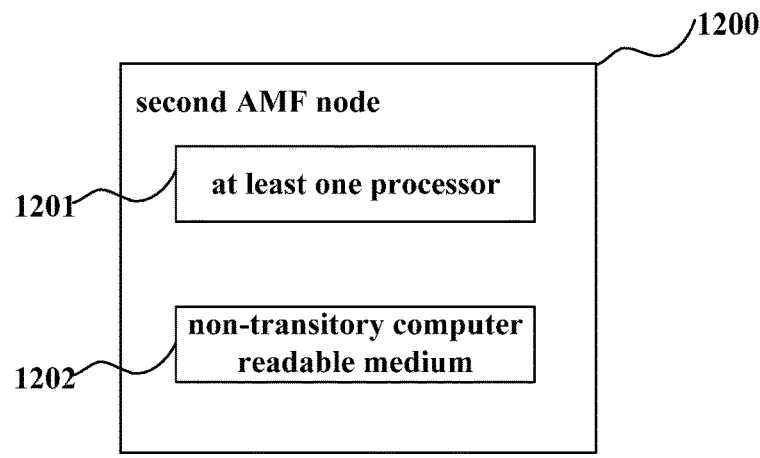
FIG. 12 is a schematic block diagram showing an example second AMF node, according to the embodiments herein.

FIG. 12 is a schematic block diagram showing an example second AMF node 1200, according to the embodiments herein. The second AMF node 1200 may be one detailed implement form of the second AMF node shown in FIG. 2.

In one embodiment, the second AMF node 1200 may include at least one processor 1201; and a non-transitory computer readable medium 1202 coupled to the at least one processor 1201. The non-transitory computer readable medium 1202 contains instructions executable by the at least one processor 1201, whereby the at least one processor 1201 is configured to perform the steps in the example method 1000 as shown in the schematic flow chart of FIG. 10; the details thereof is omitted here.

Note that, the second AMF node 1200 can be performed as hardware, software, firmware and any combination thereof. For example, the second AMF node 1200 may include a plurality of units, circuities, modules or the like, each of which can be used to perform one or more step of the example method 1000 or one or more step shown in FIG. 3-8 related to the second AMF node.

Figure 13:
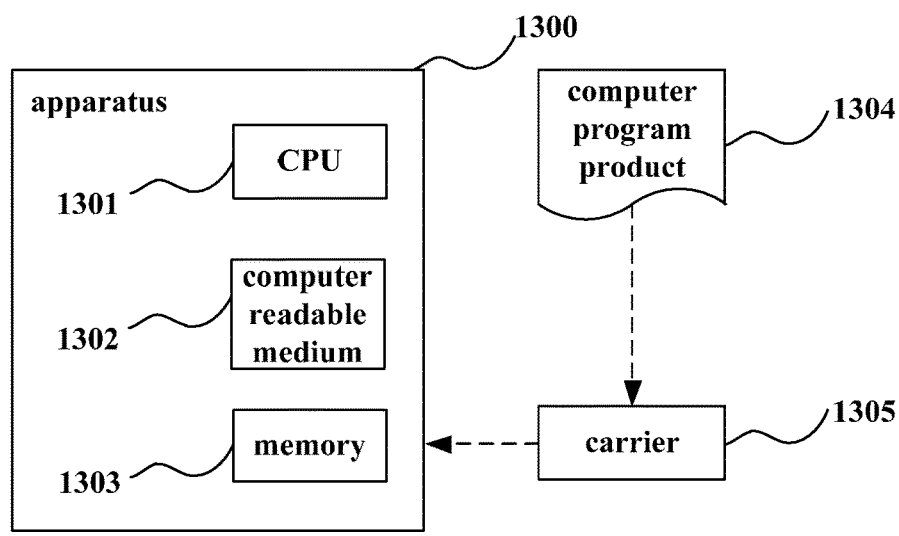
FIG. 13 is a schematic block diagram showing an apparatus, according to the embodiments herein.

FIG. 13 is a schematic block diagram showing an apparatus 1300, according to the embodiments herein. In one embodiment, the apparatus 1300 can be configured as the above mentioned apparatus, such as the first AMF node 1100, the second AMF node 1200, the first AMF node shown in FIG. 2-8, or the second AMF node shown in FIG. 2-8.

In one embodiment, the apparatus 1300 may include but not limited to at least one processor such as Central Processing Unit (CPU) 1301, a computer-readable medium 1302, and a memory 1303. The memory 1303 may comprise a volatile (e.g. Random Access Memory, RAM) and/or non-volatile memory (e.g. a hard disk or flash memory). In one embodiment, the computer-readable medium 1302 may be configured to store a computer program and/or instructions, which, when executed by the processor 1301, causes the processor 1301 to carry out any of the above mentioned methods.

In one embodiment, the computer-readable medium 1302 (such as non-transitory computer readable medium) may be stored in the memory 1303. In another embodiment, the computer program can be stored in a remote location for example computer program product 1304 (also can be embodied as computer-readable medium), and accessible by the processor 1301 via for example carrier 1305.

The computer-readable medium 1302 and/or the computer program product 1304 can be distributed and/or stored on a removable computer-readable medium, e.g. diskette, CD (Compact Disk), DVD (Digital Video Disk), flash or similar removable memory media (e.g. compact flash, SD (secure digital), memory stick, mini SD card, MMC multimedia card, smart media), HD-DVD (High Definition DVD), or Blu-ray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

Abbreviations
3GPP third Generation Partnership Project
5G fifth Generation
AMF Access and Mobility Management Function
AN Access Network
CP Control Plane
GUAMI Globally Unique AMF Identifier
NF Network Function
NRF Network Repository Function
OAM Operation Administration and Maintenance
RC Relative Capacity
RAN Radio Access Network.

What is claimed is:
1. A method in a first Access and Mobility Management Function (AMF) node, comprising:
    obtaining first information of the first AMF node, the first information at least includes one or more identifier;
    obtaining second information of each of all other nodes within the same AMF set as the first AMF node, the second information includes Relative Capacity (RC) and one or more identifier; and
    determining backup AMF for at least one identifier of the first AMF based on the first information and the second information in an autonomous way, without the participation of the Operation Administration and Maintenance (OAM).

2. The method according to claim 1, wherein the OAM initially deploys the set of AMF,
   wherein the step of obtaining the first information includes receiving RC and one or more identifier of the first AMF node from the OAM;
   wherein the step of obtaining the second information includes receiving the second information from the OAM.

3. The method according to claim 1, wherein the OAM adds the first AMF node into the AMF set,
   wherein the step of obtaining the first information includes receiving RC and one or more identifier of the first AMF node from the OAM;
   wherein the step of obtaining the second information includes receiving the second information from the OAM.

4. The method according to claim 1, wherein the OAM updates the first AMF node by changing its RC and/or identifier,
   wherein the step of obtaining the first information includes receiving the first information from the OAM;
   wherein the step of obtaining the second information includes retrieving the second information pre-stored on the first AMF node.

5. The method according to claim 1, further comprising: providing the determined backup AMF information to the 5G Access Network (AN) via NG SETUP procedure.

6. A first Access and Mobility Management Function (AMF) node, comprising:
   at least one processor; and
   a non-transitory computer readable medium coupled to the at least one processor, the non-transitory computer readable medium contains instructions executable by the at least one processor, whereby the at least one processor is configured to: perform the steps of the method according to claim 1.

7. The method according to claim 1, wherein the first AMF node recovers from failure,
   wherein the step of obtaining the first information includes retrieving RC and one or more identifier of the first AMF node pre-stored on the first AMF node;
   wherein the step of obtaining the second information includes retrieving the second information pre-stored on the first AMF node.

8. The method according to claim 1, wherein the determination of backup AMF is performed through a weighted round robin algorithm based on the Relative Capacity of each AMF or through a random way.

9. The method according to claim 1, further comprising: publishing the association between one or more identifier and the first AMF as well as the determined backup AMF information to Network Repository Function (NRF) via Network Function (NF) service Registration procedure.

10. The method according to claim 1, further comprising: updating to other Control Plane (CP) Network Function (NF) upon next NF communication, if any backup AMF has been changed.

11. A method in a second Access and Mobility Management Function (AMF) node, wherein the second AMF node is assigned one or more identifier, and wherein backup AMF has been determined for each of the one or more identifier, the method comprising:
   receiving a notification indicating a variation of a first AMF node from the Network Repository Function (NRF), the notification includes first information of the first AMF node, the first information at least includes one or more identifier;
   retrieving second information of each of all other nodes within the same AMF set, the second information includes Relative Capacity (RC) and one or more identifier, and the second information is pre-stored on the second AMF node; and
   selectively changing backup AMF for at least one identifier of the second AMF based on the first information and the second information in an autonomous way, without the participation of the Operation Administration and Maintenance (OAM).

12. The method according to claim 11, wherein the OAM removes the first AMF node from the AMF set, and the notification indicates the removal of the first AMF node,
   wherein the first information includes one or more identifier of the first AMF node,
   wherein the step of selectively changing backup AMF includes selecting new backup AMF for at least one identifier of the second AMF node, if the AMF that is removed from the AMF set is serving as backup AMF of the at least one identifier.

13. The method according to claim 11, wherein the OAM removes the first AMF node from the AMF set, and the notification indicates the removal of the first AMF node,
   wherein the first information includes one or more identifier of the first AMF node,
   wherein the step of selectively changing backup AMF includes selecting new backup AMF for at least one identifier of the second AMF node, even the AMF that is removed from the AMF set is not serving as backup AMF of the at least one identifier.

14. The method according to claim 11, wherein the first AMF node fails, and the notification indicates the failure of the first AMF node,
   wherein the first information includes one or more identifier of the first AMF node,
   wherein the step of selectively changing backup AMF includes selecting new backup AMF for at least one identifier of the second AMF node, if the failed AMF is serving as backup AMF of the at least one identifier.

15. The method according to claim 11, wherein the first AMF node fails, and the notification indicates the failure of the first AMF node,
   wherein the first information includes one or more identifier of the first AMF node,
   wherein the step of selectively changing backup AMF includes selecting new backup AMF for at least one identifier of the second AMF node, even the failed AMF is not serving as backup AMF of the at least one identifier.

16. The method according to claim 11, wherein the first AMF node recovers from failure, and the notification indicates the recovery of the first AMF node,
   wherein the first information includes RC and one or more identifier of the first AMF node.

17. The method according to claim 11, wherein the OAM adds the first AMF node into the AMF set, and the notification indicates the addition of the first AMF node,
   wherein the first information includes RC and one or more identifier of the first AMF node.

18. The method according to claim 11, wherein the OAM updates the first AMF node by changing its RC and/or identifier, and the notification indicates the update of the first AMF node.

19. The method according to claim 11, further comprising:
performing Network Function (NF) service Update procedure towards the NRF for further notifying other Control Plane (CP) NF, if any backup AMF has been changed.

20. A second Access and Mobility Management Function (AMF) node, comprising:
at least one processor; and
a non-transitory computer readable medium coupled to the at least one processor, the non-transitory computer readable medium contains instructions executable by the at least one processor, whereby the at least one processor is configured to: perform the steps of the method according to claim 11.

* * * * *